United States Patent
Konschak et al.

(10) Patent No.: US 11,300,685 B2
(45) Date of Patent: Apr. 12, 2022

(54) METHOD FOR PROVIDING CORRECTION DATA FOR DETERMINING POSITION

(71) Applicant: Bayerische Motoren Werke Aktiengesellschaft, Munich (DE)

(72) Inventors: Thomas Konschak, Siegenburg (DE); Josef Krammer, Holzkirchen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 58 days.

(21) Appl. No.: 16/400,775

(22) Filed: May 1, 2019

(65) Prior Publication Data
US 2019/0324150 A1 Oct. 24, 2019

Related U.S. Application Data

(63) Continuation of application No. PCT/EP2017/077438, filed on Oct. 26, 2017.

(30) Foreign Application Priority Data

Nov. 2, 2016 (DE) ...................... 10 2016 221 471.3

(51) Int. Cl.
*G01S 19/07* (2010.01)
*G01S 19/41* (2010.01)
(Continued)

(52) U.S. Cl.
CPC ............... *G01S 19/07* (2013.01); *G01S 19/41* (2013.01); *G01S 19/42* (2013.01); *B60L 53/12* (2019.02);
(Continued)

(58) Field of Classification Search
CPC .......... G01S 19/07; G01S 19/41; G01S 19/42; G01S 19/071; B60L 53/12
(Continued)

(56) References Cited

U.S. PATENT DOCUMENTS

| 5,438,517 A | 8/1995 | Sennott et al. |
| 9,020,755 B1 * | 4/2015 | Gazit ...................... G01S 19/41 |
| | | 701/469 |

(Continued)

FOREIGN PATENT DOCUMENTS

WO    WO 2012/068089 A1    5/2012

OTHER PUBLICATIONS

PCT/EP2017/077438, International Search Report dated Jan. 18, 2018 (Two (2) pages).

(Continued)

*Primary Examiner* — Chuong P Nguyen
(74) *Attorney, Agent, or Firm* — Crowell & Moring LLP (57) ABSTRACT

To provide correction data for determining position, first position data are determined and/or made available to a vehicle depending on an incoming Global Navigation Satellite System (GNSS) signal, the vehicle having a GNSS receiver or a differential GNSS (DGNSS) receiver for receiving the incoming GNSS signal, and the first position data being determined when the vehicle is in a charging position at a predefined charging station. Second position data are also determined and/or made available, the second position data including information which is representative of a global position of the predefined charging station. Correction data is determined depending on the first position data and the second position data. The correction data is made available to at least one further device to determine the position of the at least one further device.

14 Claims, 6 Drawing Sheets

(51) Int. Cl.
*G01S 19/42* (2010.01)
*B60L 53/12* (2019.01)
*G05D 1/02* (2020.01)

(52) U.S. Cl.
CPC ........ *B60Y 2300/91* (2013.01); *G05D 1/0212* (2013.01); *G05D 1/0278* (2013.01)

(58) Field of Classification Search
USPC .......................... 342/357.24, 357.25, 357.44
See application file for complete search history.

(56) References Cited

U.S. PATENT DOCUMENTS

| | | | | |
|---|---|---|---|---|
| 9,623,767 | B2* | 4/2017 | Imazu | B60L 53/122 |
| 9,796,280 | B2* | 10/2017 | McCool | B60L 53/12 |
| 10,029,577 | B2* | 7/2018 | Widmer | B60L 53/38 |
| 10,093,195 | B2* | 10/2018 | Ricci | B60L 53/12 |
| 10,317,526 | B2* | 6/2019 | Rink | G01S 13/931 |
| 10,369,894 | B2* | 8/2019 | McCool | H04W 4/024 |
| 10,710,466 | B2* | 7/2020 | Kees | B60L 53/35 |
| 10,814,736 | B2* | 10/2020 | Van Wiemeersch | B60L 53/12 |
| 10,821,844 | B2* | 11/2020 | Roehrl | B60L 53/65 |
| 2011/0184842 | A1* | 7/2011 | Melen | G06Q 30/04 705/34 |
| 2014/0039728 | A1* | 2/2014 | Imazu | H02J 50/10 701/2 |
| 2017/0144559 | A1* | 5/2017 | Kees | B60L 53/305 |
| 2018/0272874 | A1* | 9/2018 | McCool | H02J 50/12 |
| 2019/0241086 | A1* | 8/2019 | Bojahr | B60Q 1/245 |
| 2019/0275901 | A1* | 9/2019 | Widmer | B60L 53/30 |
| 2019/0291597 | A1* | 9/2019 | Konschak | G01S 19/51 |
| 2020/0130529 | A1* | 4/2020 | Seong | B60L 53/36 |
| 2020/0164754 | A1* | 5/2020 | Seong | H02J 50/90 |
| 2020/0298714 | A1* | 9/2020 | Widmer | B60L 3/04 |
| 2021/0008999 | A1* | 1/2021 | Rodriguez Romero | B60L 53/35 |

OTHER PUBLICATIONS

German Search Report issued in German counterpart application No. 10 2016 221 471.3 dated Sep. 30, 2019, with Statement of Relevancy (Thirteen (13) pages).

* cited by examiner

METHOD FOR PROVIDING CORRECTION DATA FOR DETERMINING POSITION

CROSS REFERENCE TO RELATED APPLICATIONS

This application is a continuation of PCT International Application No. PCT/EP2017/077438, filed Oct. 26, 2017, which claims priority under 35 U.S.C. § 119 from German Patent Application No. 10 2016 221 471.3, filed Nov. 2, 2016, the entire disclosures of which are herein expressly incorporated by reference.

BACKGROUND AND SUMMARY OF THE INVENTION

The invention relates to a method, a device and a system for providing correction data for position determination, in particular for a differential global navigation satellite system (differential GNSS or DGNSS).

Navigation apparatuses for motor vehicles often use a global navigation satellite system (GNSS), such as for example the global positioning system (GPS), the global orbiting navigation satellite system (GLONASS), Galileo or Beidou, for determining respective position and possibly also course and speed.

A GNSS, for example GPS, provides for example positioning accuracy of the order of magnitude of 10 meters. The position determination of GNSS is based on measuring distances from the receiver to a plurality of satellites. The distance is measured indirectly by way of the propagation time of the signals from the satellites to the receiver. Use is in this case made of the fact that the speed at which the signals propagate is ideally constant and known. However, in practice, certain inaccuracies arise because the speed of the signals varies slightly due to atmospheric interference. Reflections and scattering of the radio signals from buildings, as well as shading of individual satellites depending on the surroundings (for example horizon, buildings, etc.) may also disadvantageously influence the accuracy of position determination. Errors in the position determination may primarily be caused by strong attenuation, by reflection of some or all of the GNSS signals and by reception from too few satellites.

A differential global positioning system (differential GPS or DGPS) increases accuracy of GPS navigation by providing correction data, also called correction signals or difference signals. As things stand, fixed GPS receivers, so-called reference stations, are used in DGPS. For each satellite, the effective propagation times of the signals to the receiver are able to be determined highly accurately from the deviation between the actual and the received position. The reference station transmits the differences between the theoretical and the actual signal propagation times to the GPS receivers in the surroundings, for example within a radius of up to 10 km. The DGPS receivers use these indications of difference as a correction signal, by way of which the position of the receiver is able to be calculated accurately. The accuracy of the GPS signal is able to be increased significantly by using differential GPS correction data. Accuracies in the region of centimeters are therefore possible in corresponding DGPS receivers.

The shorter the distance between the corresponding DGPS receivers and the reference station, the higher the accuracy of the position determination using the correction data.

The object on which the invention is based is that of providing a method and a corresponding device and a system for providing correction data for position determination, these enabling correction data to be provided at low cost.

The invention is distinguished, according to a first and a second aspect, by a method and a corresponding device for providing correction data for position determination. In this case, first position data are determined and/or provided for a vehicle depending on a global satellite navigation system reception signal, GNSS reception signal, wherein a GNSS receiver or DGNSS receiver is arranged in the vehicle in order to receive the GNSS reception signal, and the first position data are determined when the vehicle is situated in a charging position of a predefined charging station. Furthermore, second position data are determined and/or provided, wherein the second position data comprise information representative of a global position of the predefined charging station. Correction data are determined depending on the first position data and the second position data. The correction data are provided for at least one further apparatus in order to determine a position of the at least one further apparatus.

The correction data are preferably provided for highly accurate position determination. Position determination for an object should be considered to be highly accurate if a position that is determined for the object deviates by less than 10 m, in particular by less than 1 m, from an actual position of the object.

Since the respective charging stations do not change their position in relation to the global world coordinates following installation, their position is able to be determined highly accurately upon or shortly after installation. With this knowledge, whenever a vehicle is charging above or at the charging station, correction data are able to be derived by way of the first position data and second position data, which correction data are used by other DGNSS receivers, which are situated in the vicinity (up to around 20 km away) of the charging vehicle, for highly accurate position determination. In particular, the first and second position data and/or the correction data may be determined and/or provided multiple times during a charging procedure. The charging station therefore functions together with the charging vehicle as a reference GNSS receiver.

The correction data may comprise and/or represent a difference signal, wherein the difference signal is determined by determining a difference between a measured and/or determined distance of the vehicle and the actual distance of the vehicle to each individual satellite. To this end, the absolute position of the vehicle or of the charging station and the satellite signal or signals received by the GNSS receiver are necessary. The orbit data are contained in the satellite reception signals. It is thus possible to determine an error in relation to each satellite. The calculation may in this case be performed in the charging station and/or in the vehicle and/or on the server. Missing data must in this case respectively be transmitted to the unit that is to be determined.

Advantageously, the correction data are able to be determined highly accurately. The correction data may be used for differential GNSS, in particular for a differential GPS. As an alternative or in addition, the correction data may be provided for further services. Further vehicle functions, for example autonomous driving, may be improved on the basis of the provided correction data. As an alternative or in addition, the correction data may be offered and sold online. Only a very slight additional hardware expenditure is required. For one implementation, it is necessary to provide sufficient computational power, sufficient storage space and a back-end system. Installing additional reference GPS receivers or reference GNSS receivers is able to be dispensed with. In particular for the charging stations, it is not necessary to take any additional actions. The hardware components and/or software components that are necessary for communication between the charging station and the vehicle, for example an authentication procedure having an identification ID, is in most cases already provided in connection with data-based coupling of the vehicle to the charging station (for example via WLAN) in connection with a billing system.

The global position data may also be referred to as absolute positioning data.

The predefined charging station is in particular a charging station that is or has been traveled to by a vehicle driver in order to charge an energy store of his vehicle.

In one advantageous refinement according to the first and second aspect, the second position data are determined depending on a global position of the predefined charging station and at least one further item of distance information in relation to the vehicle. This has the advantage that the second position data are able to more accurately characterize an actual position of the vehicle. The item of distance information in particular represents a distance between the predefined charging station and the vehicle.

In a further advantageous refinement according to the first and second aspect, the GNSS receiver or DGNSS receiver of the vehicle has a GNSS antenna. Furthermore, the vehicle has a charging apparatus for charging an energy store of the vehicle, and the at least one item of distance information comprises a distance between the charging apparatus and the GNSS antenna. This makes it possible to take into account specific dimensions of the vehicle when providing the second position data.

In a further advantageous refinement according to the first and second aspect, the predefined charging station comprises a primary coil of an inductive charging system, wherein the primary coil of the inductive charging system is arranged so as to be stationary, and the charging apparatus of the vehicle forms a secondary coil of the inductive charging system. Such a charging station or such a charging system has the advantage that it is possible to determine a relative position of the vehicle in relation to the global position of the charging station with high accuracy and without additional hardware expenditure. The position of the primary coil is understood in particular to be the global position of the predefined charging station.

In a further advantageous refinement according to the first and second aspect, the at least one item of distance information represents a recorded offset between the primary coil and the secondary coil, the offset being recorded when the vehicle is situated in the charging position of the predefined charging station, and the offset representing a distance between the secondary coil and a predefined reference point in relation to the primary coil. This makes it possible to be able to determine the position of the GNSS antenna of the vehicle in relation to the primary coil of the charging station to within an accuracy of a few centimeters.

In a further advantageous refinement according to the first and second aspect, correction data are in each case determined for a predefined area that has a multiplicity of charging stations that are traveled to by various vehicles and/or at various times in order to charge the vehicles. The correction data are in each case stored so as to be assigned to predefined regions of the area and/or assigned to predefined time ranges. Depending on a position of a correction data receiver and/or depending on a current time at which the correction data are requested, the correction data are selected from the multiplicity of correction data for the correction data receiver and transmitted to the correction data receiver.

This advantageously makes it possible, when there is sufficient distribution of the charging stations and sufficient residence time of the vehicles in the charging positions of the charging stations, to make the correction data available for the entire area with sufficient accuracy. By using a dense network of charging stations, the correction data are able to be determined and provided specifically for very small regions of the area, as a result of which accuracy of the position determinations is able to be increased. A central server structure may network the charging stations. The correction data are stored, in particular "merged", in one or more servers. By way of example, the correction data are averaged between a plurality of adjacent manned charging stations.

In a further advantageous refinement according to the first and second aspect, a global position of a further charging station is determined depending on the correction data that are provided depending on a region in which the further charging station is arranged, and global position data for a further vehicle that are determined for the further vehicle depending on a GNSS reception signal when the further vehicle is situated in a charging position of the further charging station, wherein a GNSS receiver or DGNSS receiver is arranged in the further vehicle in order to receive the GNSS reception signal. The position of the further charging station is therefore able to be determined highly accurately, and the charging station is able to be used as a further network element of a charging station network that makes correction data available for the predefined area.

Using the GNSS antenna of the vehicle has the advantage that the antenna is arranged in the vehicle roof in a manner optimized for reception. Better reception is therefore possible than if the antenna is arranged in the charging station, in particular in the immediate vicinity of the primary coil. The charging station may thus be adopted as a destination, in particular a "precise" destination, in the navigation.

In a further advantageous refinement according to the first and second aspect, the further charging station has a primary coil, arranged so as to be stationary, for an inductive charging system. The second vehicle has a secondary coil for the inductive system. The global position of the further charging station is determined depending on a recorded offset between the primary coil and the secondary coil when the second vehicle is situated in the charging position of the further charging station. This makes it possible to determine the global position of the further charging station very precisely.

In a further advantageous refinement according to the first and second aspect, a trajectory for autonomously driving and/or parking a further vehicle is determined depending on the provided correction data. The trajectory is thus able to be determined highly accurately. The trajectory may be determined by a back-end server and transmitted to the further vehicle and/or the trajectory may be determined by the further vehicle depending on the correction data transmitted to the further vehicle. This allows very precise travel to the charging station. In addition to increased manual comfort, autonomous location and parking above the charging station is in particular also possible. An indication of distance (vehicle-charging station) may be indicated from any desired distance. Obstacles between the vehicle and the charging station do not have any influence.

In a further advantageous refinement according to the first and second aspect, the trajectory is determined depending on satellite-assisted position data that are provided for the further vehicle by way of a GNSS receiver.

In a further advantageous refinement according to the first and second aspect, the trajectory is determined depending on odometry position data that are determined by way of an odometry system of the further vehicle. This has the advantage that the trajectory is able to be determined highly accurately even in regions in which no satellite signals are able to be received.

In a further advantageous refinement according to the first and second aspect, depending on at least one predefined operating variable for the respective charging stations, it is determined whether correction data in the predefined area are available with a predefined accuracy for all positions of the area and/or in which partial areas of the area correction data are not available with a predefined accuracy for all positions of the area. It is thus easily able to be checked whether and where further charging stations have to be installed in the predefined area in order to be able to provide the correction data with sufficient accuracy with complete coverage in the predefined area.

The at least one operating variable may be representative of a charging activity of the respective charging station and/or be representative of a time of a good signal quality of the individual coils of the charging stations.

In a further advantageous refinement according to the first and second aspect, when an additional charging station is newly installed, it is determined, depending on the at least one operating variable of charging stations in the predefined region in which the additional charging station is arranged, whether the correction data for the region meet a predefined accuracy requirement for position determination of the charging station. This has the advantage that it is easily able to be decided how the global position of the charging station should be determined.

The invention is distinguished, according to a third aspect, by a system for providing correction data for position determination, having at least one charging station, at least one vehicle and a device according to the second aspect. The at least one charging station is designed to transmit a global position of the charging station to the at least one vehicle. The at least one vehicle is designed to determine first position data for the vehicle depending on a global satellite navigation system reception signal, GNSS reception signal, wherein a GNSS receiver or DGNSS receiver is arranged in the vehicle in order to receive the GNSS reception signal, and the first position data are determined when the vehicle is situated in a charging position of a predefined charging station. The at least one vehicle is furthermore designed to transmit the first position data to the device. The at least one vehicle is furthermore designed to determine second position data depending on the global position data of the at least one charging station and to transmit the second position data to the device.

Advantageous refinements of the second aspect also apply in this case to the third aspect.

Exemplary embodiments of the invention are explained below with reference to the schematic drawings.

Other objects, advantages and novel features of the present invention will become apparent from the following detailed description of one or more preferred embodiments when considered in conjunction with the accompanying drawings.

DETAILED DESCRIPTION OF THE DRAWINGS

Elements having the same construction or function are provided with the same reference signs throughout the Figures.

Figure 1:
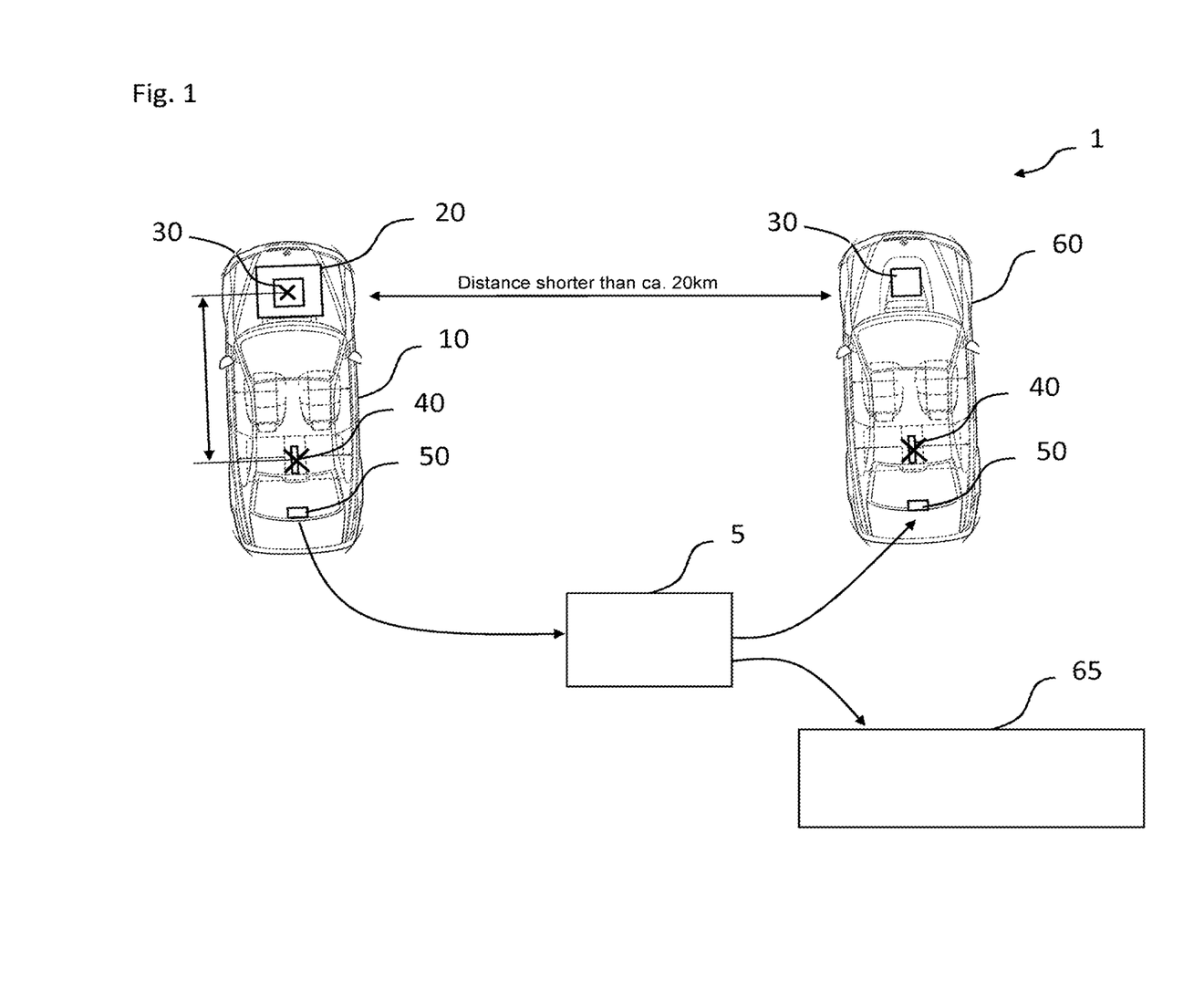
FIG. 1 shows a system having a server for providing correction data for position determination.

FIG. 1 shows a system 1 having a server 5 for providing correction data K for position determination. The server 5 may also be referred to as a device for providing correction data K for position determination.

Figure 2:
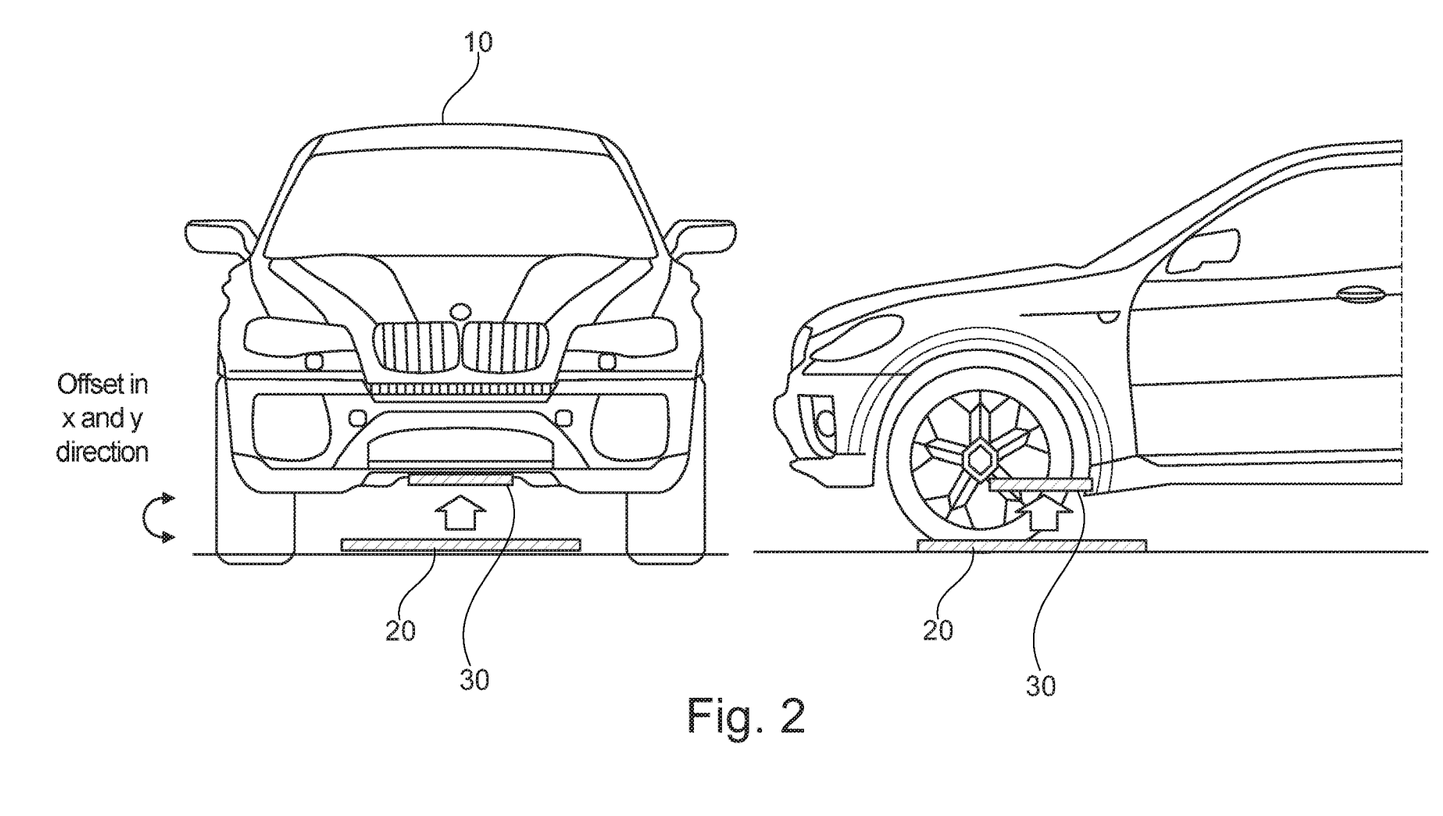
FIG. 2 shows an exemplary inductive charging system for a vehicle.

The system 1 comprises at least one charging station. The charging station preferably has a primary coil 20 of an inductive charging system. The primary coil 20 is preferably arranged so as to be stationary, for example installed fixedly on the ground. An exemplary inductive charging system is shown in FIG. 2.

The system 1 (FIG. 1) furthermore comprises at least one vehicle 10. The at least one vehicle 10 is preferably designed as an electric or hybrid vehicle having an electrified drivetrain and has an apparatus for charging an energy store of the at least one vehicle 10. The apparatus comprises for example a secondary coil 30 for charging the energy store at a charging station.

The at least one vehicle 10 has a GNSS receiver. The GNSS receiver comprises for example a GNSS antenna 40 for receiving the satellite signals. The GNSS receiver furthermore comprises a computer unit that is designed, depending on the received satellite signals, to determine the position of the at least one vehicle 10. The GNSS antenna 40 is preferably arranged on the at least one vehicle 10 at a predefined position such that, when the at least one vehicle 10 is situated in the charging position of the charging station, taking into account the stationary global position of the charging station and a relative position of the at least one vehicle 10 in relation to the charging station, the global position of the at least one vehicle 10 is known with an accuracy in the region of <10 cm.

The at least one vehicle 10 furthermore has a communication apparatus 50 that is designed to transmit data to other apparatuses, for example to the server 5, to further vehicles 60, further back-end servers and so on.

The server 5 is in particular designed to receive first position data P1 and second position data P2 from the at least one vehicle 10 and to determine correction data K for position determination, in particular for highly accurate position determination, and forward the data to further apparatuses 65, 60, 75. The further apparatuses may comprise for example further vehicles and/or second vehicles and/or mobile apparatuses and/or stationary apparatuses. The server 5 is additionally designed for example to receive further data from the at least one vehicle 10 and/or the charging station and statistically evaluate the data.

The server 5 is in particular designed to provide a program for providing correction data K for position determination.

FIG. 2 shows an exemplary inductive charging system for a vehicle having an electrified drivetrain.

Vehicles having an electrified drivetrain usually have a charging interface to an external charging source. Electric power is normally transferred in a wired manner or inductively, in order to charge an electrochemical energy store of the vehicle, for example.

In wired charging methods, the vehicle has to be connected to the external charging source, such as for instance a charging station, via a charging cable in order to perform a charging procedure. In inductive charging methods, the power transfer is performed by way of an electromagnetic excitation field of a primary coil 20, external to the vehicle, to a vehicle-side secondary coil 30 via electromagnetic induction at the secondary coil 30. The transfer efficiency of the electric power in this case depends on the relative spatial position of the secondary coil 30 with respect to the primary coil 20. In one preferred position range of the secondary coil 30 in relation to the primary coil 20, the proportion of excitation power that arises as power loss during charging is approximately minimal. The relative position of the two coils 20, 30 with respect to one another is typically determined with an accuracy of +/−2 cm.

The main component of the charging station is the primary coil 20. The charging station may be suitable for charging a multiplicity of vehicles, only a single vehicle being able to be charged at the primary coil 20 at a specific time. The primary coil 20 is integrated into the charging station in a mechanically fixed manner. The charging station is situated so as to be stationary in or on the ground. The charging station furthermore has an induction controller.

The time between an initialization procedure for the charging connection and a termination procedure for the charging connection is referred to as a charging procedure. The charging procedure in particular comprises those times at which electric power is transferred from the primary coil 20 to be secondary coil 30, or is at least able to be transferred.

One prerequisite for a charging procedure is that the secondary coil 30 is situated in a charging position, that is to say in a particular spatial region in relation to the primary coil 20. This spatial region is characterized such that a predefined geometric reference point of the secondary coil 30, which depends on the configuration of the secondary coil 30, deviates from a predefined geometric reference point of the primary coil 20, which depends on the configuration of the primary coil 20, only within a predefined tolerance level (circa 1 cm) for each of the three directions in space with respect to the three directions in space that form the vehicle-based coordinate system known to those skilled in the art.

If the reference point of the secondary coil 30 is situated spatially in relation to the reference point of the primary coil 20 such that the distance, in relation to each of the three directions in space, between these two reference points does not exceed the predefined tolerance level for the respective axis, the secondary coil 30 is situated in the charging position. Due to the fact that the secondary coil 30 is situated so as to be mechanically fixed on the vehicle, or is integrated into the vehicle, provided that the secondary coil 30 is situated in the charging position, the vehicle is also situated in a vehicle charging position. Since, in the context of this document, the vehicle charging position has the same meaning as the charging position in respect of their technical effect, the term vehicle charging position will likewise be understood to mean the same as the term charging position for the sake of simplicity.

Figure 3:
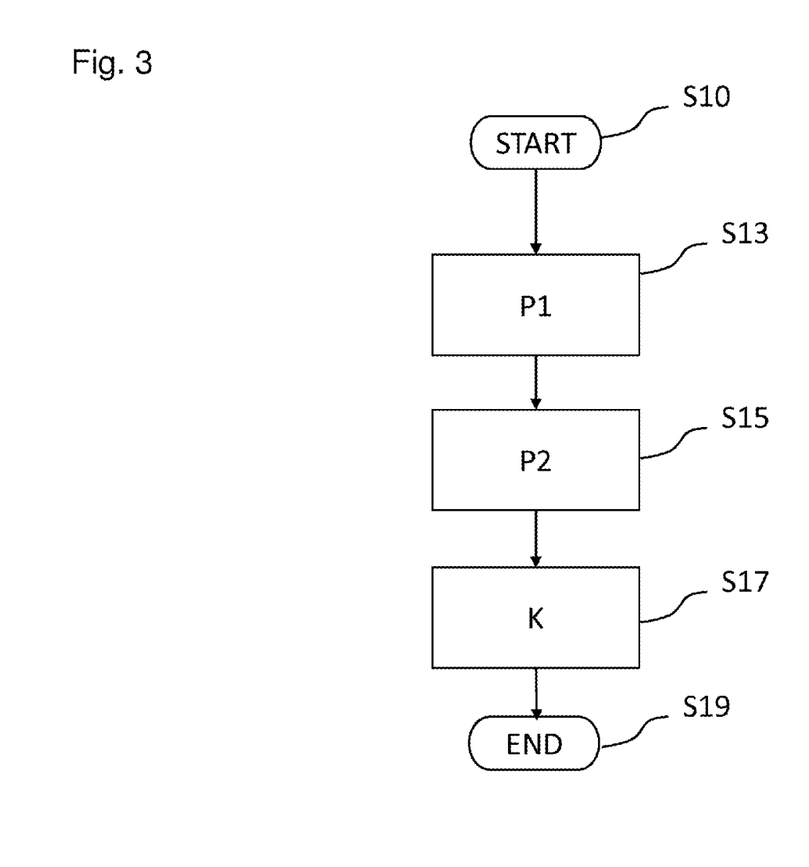
FIG. 3 shows an exemplary flow chart of a program for providing correction data for position determination.

FIG. 3 shows an exemplary flow chart for the program for providing correction data K for position determination.

The program is started in a step S10.

First position data P1 of the at least one vehicle 10 are provided in a step S13, wherein the first position data P1 comprise GNSS position data of the at least one vehicle 10 that are determined depending on a global satellite navigation system reception signal, GNSS reception signal, wherein the GNSS receiver or DGNSS receiver is arranged in the vehicle in order to receive the GNSS reception signal, and the first position data P1 are determined when the vehicle 10 is situated in a charging position of a predefined charging station. Step S13 may be repeated multiple times during a charging procedure for the at least one vehicle 10.

Second position data P2 are provided in a step S15, wherein the second position data P2 comprise information representative of a global position of the selected charging station.

In a step S17, the correction data K are determined depending on the first position data P1 and second position data P2 and preferably stored.

The program is ended in a step S19. The program is in each case executed repeatedly, for example, when updated position data P1, P2 are received.

The first position data P1 are preferably determined by the GNSS receiver of the at least one vehicle 10 and transmitted to the server 5.

The global position data of the charging stations are preferably stored in the respective charging stations, for example in the charging controller of the at least one charging station, and the charging stations are preferably designed to transmit the global position data of the charging station data to the respective at least one vehicle 10 that is situated in the charging position of the charging station. The transmission may in this case be performed wirelessly and/or in a wired manner.

The at least one vehicle 10 preferably has a computer apparatus that is designed to receive the global position data of the selected charging station and to determine the second position data P2 depending on the global position data of the charging station and at least one further item of distance information in relation to the at least one vehicle 10.

The at least one item of distance information may comprise for example a distance between the secondary coil 30 of the at least one vehicle 10 and the GNSS antenna 40 of the at least one vehicle 10.

The at least one item of distance information preferably additionally comprises an offset between the secondary coil 30 of the at least one vehicle 10 and the primary coil 20 of the selected charging station. This offset is recorded for example during a parking procedure for the at least one vehicle 10 in the charging position.

The position of the GNSS antenna 40 of the at least one vehicle 10 is therefore known, in relation to the ground coil or primary coil 20 of the charging station, to within a few cm.

When the at least one vehicle 10 is situated in the charging position of the selected charging station, the global position of the at least one vehicle 10 is therefore known with an accuracy in the region of <10 cm.

A difference or deviation between the first and second position data P1, P2 is therefore also a measure for accuracy of the first position data P1, determined using the GNSS receiver, for the at least one vehicle 10. By way of example, the correction data K may be determined depending on the difference or the deviation between the first position data P1 and the second position data P2.

As an alternative or in addition, the charging station may be designed to transmit the global position data of the charging station to the server 5 and/or the global position data may be stored on the server 5. The server 5 may furthermore be designed to store predefined distance measurements of various vehicle types and to determine the correction data K depending on an item of information that the server 5 receives for example from the at least one vehicle 10 and that is representative of a vehicle type and therefore of a distance between the GNSS antenna 40 and the secondary coil 30 of the at least one vehicle 10.

As an alternative or in addition, the selected charging station and/or the at least one vehicle 10 may be designed to transmit the parking offset of the at least one vehicle 10 to the server 5. The server 5 may be designed to determine the correction data K depending on the global position data of the selected charging station and the at least one item of distance information, in particular the offset between the primary coil 20 and the secondary coil 30 and/or the distance between the GNSS antenna 40 and the secondary coil 30.

The correction data K are provided by the server 5 and may for example be retrieved from any other apparatuses 65 and/or further vehicles 60.

As an alternative or in addition to executing the program on the server 5, the method may also be implemented completely on the part of the vehicle 10.

Using the correction data K, it is possible to determine a highly accurate DGNSS position of a further vehicle 60 that is situated within predefined surroundings of the at least one charging vehicle 10 or of the charging station. The position of the further vehicle 60 as determined by way of DGNSS deviates for example by <10 cm from an actual position of the further vehicle 60. The further vehicle 60 is in this case preferably at a maximum distance of circa 20 km from the at least one charging station whose global position data are used to determine the correction data K, since accuracy of the correction data K decreases with increasing distance.

Figure 4:
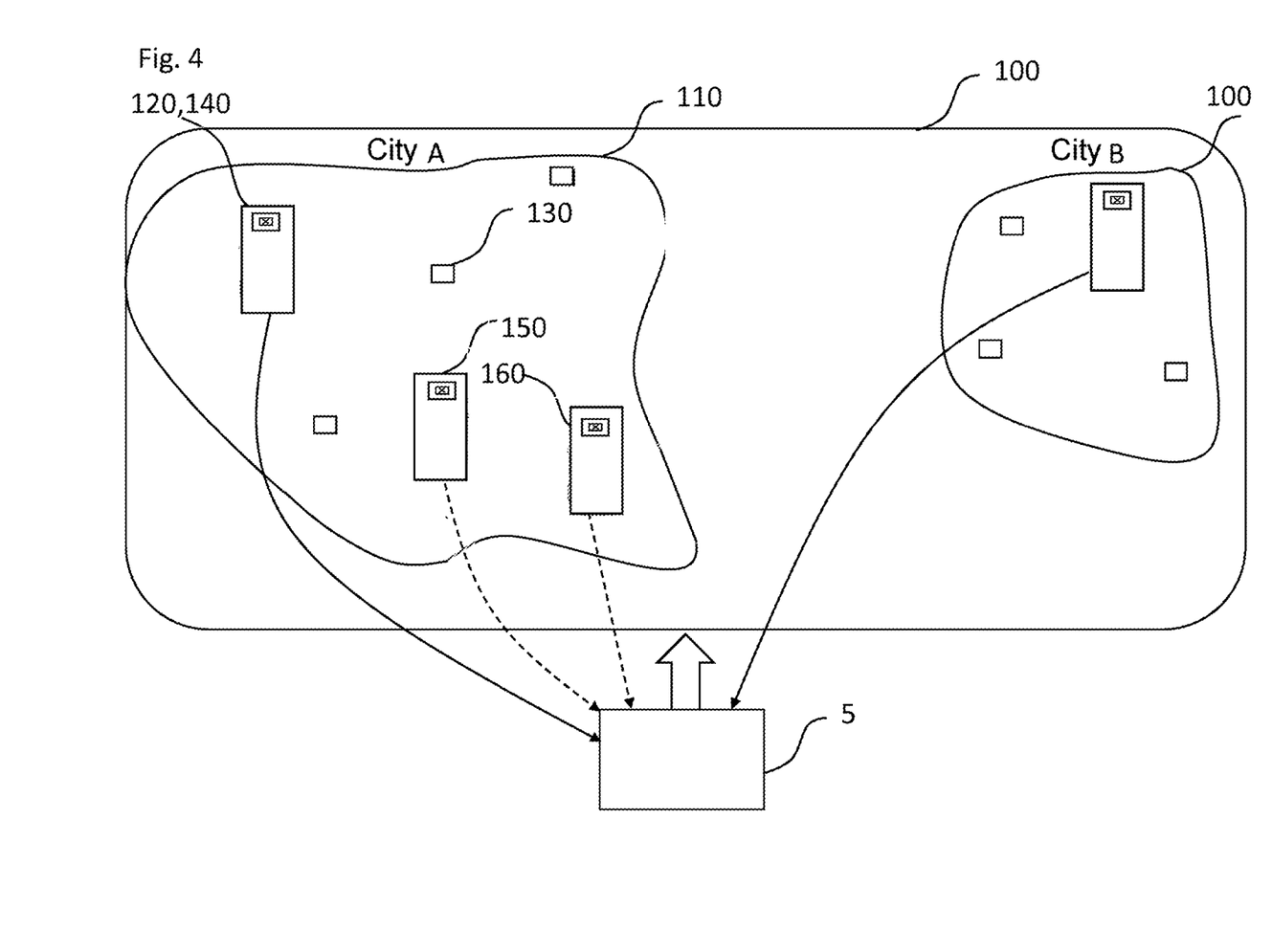
FIG. 4 shows an exemplary charging station network.

FIG. 4 shows an exemplary charging station network. The charging station network has free charging stations 130 and occupied charging stations 120. The charging stations are sometimes visited at different times and sometimes at the same time. A first network charging station 140 is for example occupied during an entire predefined observation time interval, and at least the first position data P1 are regularly transmitted from the vehicle at the first network charging station 140 to the server 5. The second position data P2 are transmitted once or else repeatedly to the server 5. A second network charging station 150 is for example only traveled to during the predefined observation time interval. Only then are at least the first position data P1 regularly transmitted from the vehicle at the second network charging station 150 to the server 5. The second position data P2 are transmitted once or else repeatedly to the server 5. A third network charging station 160 is departed before the end of the predefined observation time interval, for example, and at least the first position data P1 are transmitted from the vehicle at the third network charging station to the server 5 only until the time of departure from the third network charging station 160. The second position data are transmitted once or else repeatedly to the server 5. The server 5 is designed to determine the correction data K for the predefined area depending on the first and second position data P1, P2 made available during the predefined observation time interval.

The correction data K are for example in each case stored so as to be assigned to predefined regions of the area and/or assigned to predefined time ranges and, depending on a position of a correction data receiver, for example a DGNSS receiver, and/or depending on a current time at which the correction data K are requested, the correction data K for the correction data receiver are selected from the multiplicity of correction data K and transmitted to the correction data receiver.

Figure 5:
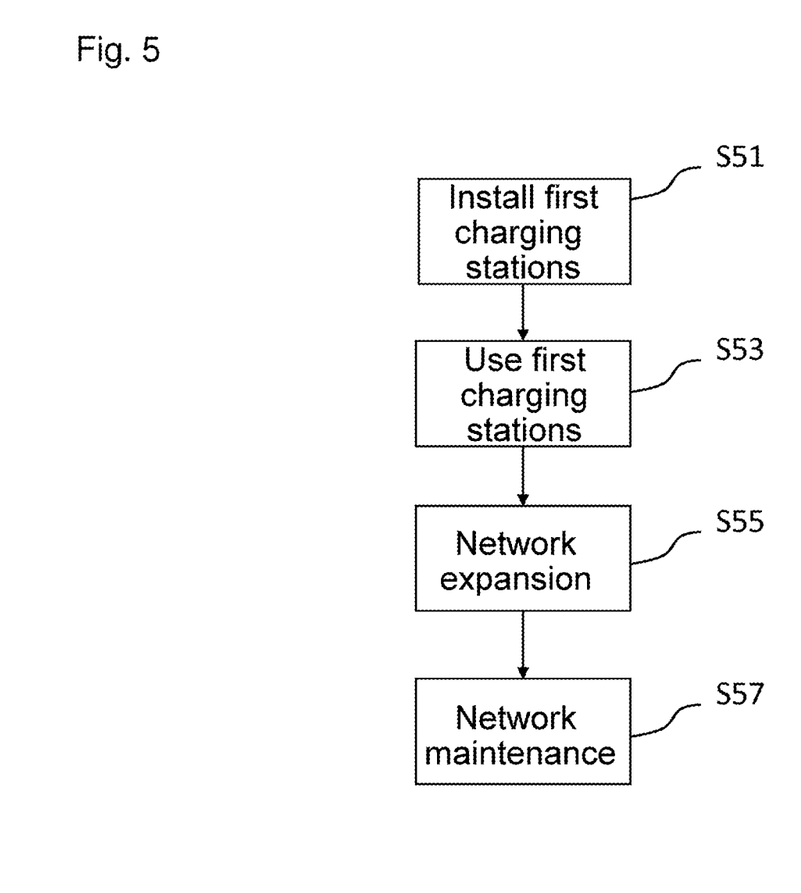
FIG. 5 shows a flow chart for a method for constructing a charging station network for a DGNSS.

FIG. 5 shows a flow chart for a method for constructing a charging station network for a DGNSS.

In a step S51, a predefined number of first charging stations is installed in a predefined area for which the charging station network is intended to be constructed, a distance between the charging stations being very large. The charging stations preferably comprise primary coils 20 for inductive charging systems. The global position data of the charging stations are therefore determined using a DGPS receiver, for example, and transmitted for example to a central computer unit, for example to the server 5.

In a further step S53, at least one portion of the first charging stations are used to determine correction data K, and operating variables, for example in relation to a charging activity of the respective charging stations and/or times of good signal quality of the coils of the inductive charging systems, are recorded for at least another portion of the first charging stations. The recorded operating variables are preferably statistically evaluated.

Depending on the recorded operating variables, it is determined for example whether enough first charging stations are installed in the predefined area such that a differential GNSS receiver that is situated at a particular location in the area at a particular time is able to receive correction data with sufficient accuracy from the central apparatus. As an alternative or in addition, there may be determination, depending on the recorded operating variables, of regions of the area in which there are no charging stations for providing a charging station network with complete coverage.

The server 5 thus determines for example instructions for the installation and the operation of such a charging station network. It is thus able to be determined for example whether dedicated surveying of the charging station is necessary for a new installation, or whether this is able to be determined by way of the system 1 itself in the initial charging procedures, as described below. Continuous monitoring of the charging activities may be used to take additional measures when the density of charging stations is low and/or the number of charging procedures continuously taking place becomes too low in an area.

Further charging stations are installed in a step S55. When installing the further charging stations, the charging station network is already sufficiently dense for providing correction data for the entire area, that is to say a dense charging station network is already present that is sufficiently visited by vehicles. In this case, for at least one portion of the further charging stations, the absolute position determination is performed by way of correction data K. In this case, for example for a further vehicle 60 that is situated in the charging position of the newly installed charging station, a DGNSS position, that is to say a highly accurate position, is determined by way of a DGNSS receiver. The global position of the charging station is then determined depending on the DGNSS position of the further vehicle 60 and for example depending on the recorded offset between the primary coil 20 of the charging station and the secondary coil 30 of the further vehicle 60 and/or the distance between the DGNSS antenna of the further vehicle 60 and the secondary coil 30 of the further vehicle 60.

The further charging stations allow more accurate calculation of the correction signals.

The charging station network is monitored in a step S57. Algorithms that run in the back-end, for example on the server 5, continuously execute statistical evaluations, for example correlation calculations, averaging, learning systems and so on, depending on the at least one provided operating variable of the charging stations, in order to optimize the charging station network, in particular the quality of the provided correction data K. If it is established that there is permanently or temporarily not sufficient determination of correction data or of differential signals by charging vehicles 10 in an area, for example warnings are generated and/or installation instructions are output, for example indicating that an additional antenna should be installed or the missing correction data K should be purchased from another service provider.

Figure 6:
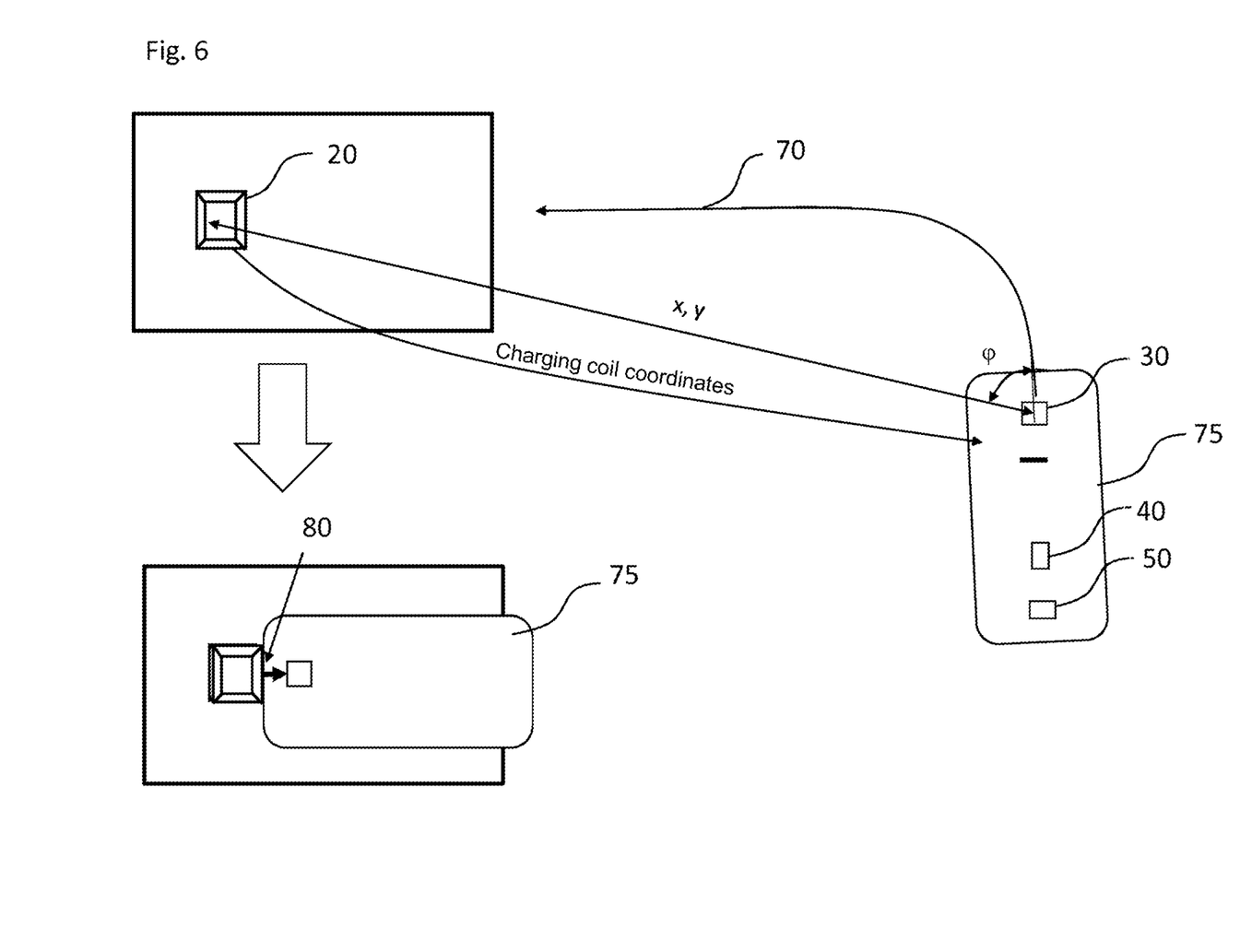
FIG. 6 shows an exemplary application of the provided correction data.

FIG. 6 shows an exemplary application of the provided correction data K. In the example shown, the correction data K are used to assist autonomous driving and/or autonomous parking of a second vehicle 75 in a charging position, by determining a trajectory 70 for autonomously driving and/or parking the second vehicle 75 depending on the provided correction data K.

FIG. 6 shows how the accurate DGNSS data that are determined depending on the correction data K and the position determined by way of GNSS may be used within a charging station network to optimize an approach procedure to the charging station, both manually and autonomously. If the parking second vehicle 75 is situated in the immediate vicinity of the charging station, a local distance measurement may assist the guidance.

First of all, charging coil coordinates of the primary coil 20 are transmitted for example from the charging station to the second vehicle 75 to be parked. The transmission may be performed via a radio connection, for example. A distance (x, y φ) of the primary coil 20 is determined for example in the parking second vehicle 75, depending on the charging coil coordinates and a vehicle position determined by way of differential GNSS, wherein the second vehicle 75 receives correction data K and a differential GNSS receiver of the second vehicle 75 determines the position of the second vehicle 75 depending on the correction data K.

The second vehicle 75 determines the trajectory 70 for traveling to the primary coil 20 of the charging station, for example depending on the position, determined by way of the DGNSS receiver, of the second vehicle 75 and the charging coil coordinates for the second vehicle 75.

The charging system optionally has a positioning system and, as soon as the second vehicle 75 is situated in the vicinity 80 of a positioning system, the positioning system of the charging station takes over the distance determination. The positioning system comprises a distance measurement.

For the case of application of manual traveling to the charging station, the distance, determined as described above, may be signaled and/or optically displayed in the second vehicle 75.

Approach assistance may also be used for positioning at charging stations that are arranged in areas that do not have any satellite reception, for example in garages and/or covered parking lots. To assist with correct positioning (locating the charging position), the more accurate vehicle position may be used when the last meters are tracked by way of odometry data of the vehicle. In the case of a distance from the GNSS reception end area that is not excessively large, sufficient accuracy is still provided. The GNSS reception may end at a parking lot entrance, for example.

LIST OF REFERENCE CHARACTERS 1 system
5 server
10 vehicle
20 primary coil
30 secondary coil
40 GNSS antenna
50 communication apparatus
60 further vehicle
65 further apparatus
70 trajectory
75 second vehicle
80 vicinity
100 area
110 region
120 occupied charging station
130 free charging station
140 first network charging station
150 second network charging station
160 third network charging station
K correction data
P1 first position data
P2 second position data
S10 . . . S19 program steps
S51 . . . S57 flow chart steps The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for providing correction data for position determination, comprising the acts of:
   determining first position data corresponding to a global navigation satellite system (GNSS) position of a first vehicle situated in a charging position of a first charging station, from a GNSS reception signal received by a GNSS receiver of the vehicle
   determining second position data from a pre-stored reference global position of the first charging station;
   determining first correction data by comparing the first position data and the second position data;
   providing the determined first correction data to an apparatus that uses the first correction data to determine a position of the apparatus via the GNSS; and
   determining a trajectory for autonomously driving and/or parking a second vehicle depending on the provided correction data.

2. The method as claimed in claim 1, wherein the second position data are determined from the pre-stored reference global position of the first charging station and an item of distance information in relation to the first vehicle.

3. The method as claimed in claim 2, wherein:
   the GNSS receiver includes a GNSS antenna;
   the first vehicle has a charging apparatus for charging an energy store thereof; and
   the item of distance information is a distance between the charging apparatus and the GNSS antenna.

4. The method as claimed in claim 3, wherein the first charging station includes a primary coil of an inductive charging system, wherein the primary coil of the inductive charging system is disposed so as to be stationary, and wherein the charging apparatus of the first vehicle forms a secondary coil of the inductive charging system.

5. The method as claimed in claim 4, wherein the item of distance information includes a recorded offset between the primary coil and the secondary coil, wherein the offset is recorded when the first vehicle is situated in the charging position of the first charging station, and wherein the offset represents a distance between the secondary coil and a predefined reference point in relation to the primary coil.

6. The method as claimed in claim 1, further comprising the acts of:
   storing a plurality of correction data, including the first correction data, as for a predefined area and as respectively assigned to a predefined region of the predefined area and/or a predefined time range, wherein the predefined area has a plurality of charging stations that includes the first charging station;
   selecting a particular correction data from the plurality of correction data based on a position of a GNSS antenna of a second vehicle and/or a time of a correction data request made by the second vehicle; and
   transmit the selected particular correction data to the second vehicle.

7. The method as claimed in claim 6, further comprising:
   determining whether correction data in the predefined area are available with a predefined accuracy for all positions of the predefined area and/or correction data in partial areas in the predefined area are not available with the predefined accuracy, wherein the determination is based on a respective predefined operating variable for the plurality of charging stations.

8. The method as claimed in claim 7, further comprising:
   determining, when an additional charging station is newly installed based on the respective predefined operating variable for the plurality of charging stations in the predefined region in which the additional charging station is newly installed, whether correction data for the predefined region meet a predefined accuracy requirement for position determination of the additional charging station.

9. The method as claimed in claim 1 further comprising the acts of:
   determining second position data of a second charging station from a pre-stored reference global position of the second charging station; and
   determining a GNSS position of a second vehicle situated in the second charging station, via a second GNSS reception signal received by a second GNSS receiver of the second vehicle.

10. The method as claimed in claim 9, wherein:
    the further second charging station has a primary coil disposed so as to be stationary for a second inductive charging system;
    the second vehicle has a secondary coil for the second inductive charging system; and
    the second position data of the second charging station is determined based on a recorded offset between the primary coil and the secondary coil of the second inductive charging system when the second vehicle is situated in the charging position of the second charging station.

11. The method as claimed in claim 1, wherein the trajectory is determined depending on satellite-assisted position data that are provided for the second vehicle by way of a second GNSS receiver of the second vehicle.

12. The method as claimed in claim 1, wherein the trajectory is determined depending on odometry position data that are determined by way of an odometry system of the second vehicle.

13. A device for providing correction data for position determination, wherein the device is configured to:
    determine first position data corresponding to a global navigation satellite system (GNSS) position of a vehicle situated in a charging position of a predefined charging station, from a GNSS reception signal received by a GNSS receiver of the vehicle;
    provide second position data determined from a pre-stored reference global position of the predefined charging station;
    determine correction data by comparing the first position data and the second position data;
    provide the determined correction data to an apparatus that uses correction data to determine a position of the apparatus via the GNSS; and
    determine a trajectory for autonomously driving and/or parking a second vehicle depending on the provided correction data.

14. A system for providing correction data for position determination, comprising:
    a charging station;
    a vehicle; and
    the device as claimed in claim 13;
    wherein the charging station is configured to transmit the pre-stored reference global position of the charging station to the vehicle;
    wherein the vehicle is configured to:
      determine the first position data corresponding to global navigation satellite system (GNSS) position of the vehicle situated in the charging position of the charging station, from the GNSS reception signal received by the GNSS receiver of the vehicle;
      transmit the first position data to the device;
      determine the second position data from the pre-stored reference global position of the charging station and transmit the second position data to the device; and
      determine a trajectory for autonomously driving and/or parking a second vehicle depending on the provided correction data.

* * * * *